(12) United States Patent
Ooshima et al.

(10) Patent No.: US 8,464,072 B2
(45) Date of Patent: Jun. 11, 2013

(54) STORAGE MEDIUM ACCESS CONTROL METHOD

(75) Inventors: Hiroyoshi Ooshima, Yokohama (JP); Katsumi Iijima, Tokyo (JP); Yojiro Tagawa, Narashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 1413 days.

(21) Appl. No.: 11/219,832

(22) Filed: Sep. 7, 2005

(65) Prior Publication Data

US 2006/0059375 A1    Mar. 16, 2006

(30) Foreign Application Priority Data

Sep. 10, 2004    (JP) ................. 2004-264374

(51) Int. Cl.
    *G06F 21/00*    (2006.01)
(52) U.S. Cl.
    USPC ........... 713/193; 713/187; 713/176; 713/171; 705/50; 705/51; 705/52; 380/227
(58) Field of Classification Search
    USPC ................... 713/187, 176, 171, 23, 191–193, 713/158; 701/69, 1, 22, 36; 705/1, 52, 51, 705/4; 726/9, 20, 30, 21; 725/6
    See application file for complete search history.

(56) References Cited

U.S. PATENT DOCUMENTS

| | | | |
|---|---|---|---|
| 5,623,637 A * | 4/1997 | Jones et al. ................... 711/164 |
| 6,134,201 A | 10/2000 | Sako et al. | |
| 6,859,789 B1 | 2/2005 | Hayashi et al. | |
| 7,043,020 B2 * | 5/2006 | Maillard et al. ............. 380/227 |
| 7,228,558 B1 * | 6/2007 | Lebouill ......................... 725/86 |
| 2001/0021255 A1 * | 9/2001 | Ishibashi ....................... 380/277 |
| 2002/0085722 A1 | 7/2002 | Asano et al. | |
| 2003/0221066 A1 * | 11/2003 | Kaneko .......................... 711/115 |
| 2004/0006703 A1 * | 1/2004 | Kitani et al. .................. 713/193 |
| 2004/0153657 A1 | 8/2004 | Fujiwara et al. | |
| 2004/0242029 A1 | 12/2004 | Nakamura et al. | |
| 2005/0050363 A1 * | 3/2005 | Naka et al. ..................... 713/201 |
| 2006/0026444 A1 | 2/2006 | Asano et al. | |
| 2006/0173787 A1 * | 8/2006 | Weber et al. .................... 705/59 |
| 2009/0037721 A1 | 2/2009 | Fujiwara et al. | |

FOREIGN PATENT DOCUMENTS

| | | |
|---|---|---|
| CN | 1267856 | 9/2000 |
| CN | 1389043 | 1/2003 |
| CN | 1147085 | 4/2004 |
| EP | 1 128 598 | 8/2001 |
| JP | 9-115241 | 5/1997 |

(Continued)

OTHER PUBLICATIONS

"Digital rights management in consumer electronics products"; Jonker et al; IEEE Signal Processing Magazine Mar. 2004; 10 pages.*

*Primary Examiner* — Taghi Arani
*Assistant Examiner* — Jason Lee
(74) *Attorney, Agent, or Firm* — Fitzpatrick, Cella, Harper & Scinto

(57) ABSTRACT

The present invention controls to read encrypted digital data from a detachable storage medium, in which the digital data and a decode key for decoding encryption of the digital data are stored. In reading the digital data, the decode key is read, the decode key is deleted from the storage medium, the encrypted digital data is read, and then encryption of the encrypted digital data is decoded by the read decode key.

2 Claims, 15 Drawing Sheets

FOREIGN PATENT DOCUMENTS

| | | |
|---|---|---|
| JP | 9-307543 | 11/1997 |
| JP | 10-293725 | 11/1998 |
| JP | 2000-48479 | 2/2000 |
| JP | 2000-307569 | 11/2000 |
| JP | 2001-57019 | 2/2001 |
| JP | 2001-067269 | 3/2001 |
| JP | 2001-76425 | 3/2001 |
| JP | 2002-84271 | 3/2002 |
| JP | 2003-99729 | 4/2003 |
| JP | 2003-233795 | 8/2003 |
| JP | 2004-054473 | 2/2004 |
| JP | 2004-054834 | 2/2004 |

* cited by examiner

STORAGE MEDIUM ACCESS CONTROL METHOD

BACKGROUND OF THE INVENTION

1. Field of the Invention

The present invention relates to a method of controlling access to a detachable storage medium.

2. Description of the Related Art

Recently, in personal computers, personal digital assistants, cellular phones, digital still cameras, and the like, fixed disks and detachable storage mediums such as a SD (Secure Digital) memory card are used as a storage device in which digital data is stored.

For example, the storage medium is attached to the digital still camera, and taken image data is stored in the storage medium. SD memory card in which the image data is stored can be connected to a card reader of the personal computer to access to the image data with the personal computer. Accordingly, in the storage medium, it is necessary that write and read can be performed to the same data with all the devices on which a connection interface is mounted, namely, device compatibility is required.

There is a problem in the storage medium which is widely used due to the device compatibility. That is, in the case where the storage medium is used in order to distribute the data such as multimedia contents and firmware update data having a commercial value, there is the problem that unauthorized copy can easily be made.

Windows 2000 Professional (registered trademark of Microsoft, U.S.) and the like which are of OS (Operating System) in the personal computer are widest used as measures against the problem. In the measures, a user cannot utilize data on the storage medium unless the user buys a license to obtain a serial number. However, in the measures, because one license can be utilized by an indefinite number of devices, unauthorized use is easy to perform in software or the like in which one license should be required for one device.

Another method is applied to the storage mediums such as the SD memory card having a data area in which access can be restricted. That is, the number of times of data reading is set in an area in which access can be restricted, the number of times of data reading is decremented every time the data is used, and the data cannot be read when the number of times of data reading becomes zero. However, in the method, because the number of times of data reading is restricted to the device in which the access should be permitted, the method cannot be applied to the data which is probably used over and over again. Further, since any device can read the data until the number of times of data reading becomes zero, the data can be used in an indefinite number of information devices.

In addition, for example Japanese Patent Application Laid-Open (JP-A) No. H09-115241 discloses a method of storing the data by encrypting the data based on unique information on the storage medium. However, in the method, because there is possibility to obtain the storage medium unique information necessary for data decode can be obtained, anyone who knows a decoding method can use the data. Therefore, the method is not suitable for the distribution of the data having the commercial value.

The methods, in which the data is encrypted and stored to restrict the device being able to decode the data, are disclosed for example in JP-A-No. H10-293725, JP-A-No. 2000-048479, JP-A-No. 2001-076425, and JP-A-No. 2002-084271.

In the method disclosed in JP-A-No. H10-293725, a key used in the encryption is further encrypted by a secret key, and the key is stored along with the data. The secret key is stored on the storage medium by the method which cannot be obtained from the outside. Therefore, the data can be obtained only by a special device called decoding unit having means for obtaining the secret key. However, in the method, since the data can be obtained only by the special device called decoding unit, the device compatibility is lost.

In the data protection method disclosed in JP-A-No. 2000-048479, the data is stored by encrypting the data with ID unique to a recording device, which allows the data to be reproduced only by the same recording device. However, since the data can be reproduced only by the same recording device, it is necessary that both the digital data and the recording device are distributed in order to apply the method to the data which is developed for the purpose of the distribution of the firmware update data and the like. As s result, the device compatibility is lost and cost is increased.

In the method disclosed in JP-A-No. 2001-076425, the data is encrypted by a contents key, the contents key and the encrypted data are transferred a data storage device, the contents key is encrypted by a retaining key unique to the data storage device, and the contents key and the data are stored. Therefore, the data can be reproduced only by the data storage device. However, as with the method disclosed in JP-A-No. 2000-048479, since it is necessary that both the digital data and the data storage device are distributed, the device compatibility is lost and the cost is increased.

In the data protection method disclosed in JP-A-No. 2002-084271, the data is encrypted so as to be able to be decoded only by combination of secret information and a media key, and the data and the secret information are stored on the storage medium. Therefore, the data can be reproduced only by the device having the media key. However, in the method, since any information device having the media key can use the data without limitation, there is a possibility that the unauthorized use of the data is performed by an indefinite number of devices.

Further, there is the method in which a license agreement system is adopted and the decode key is stored in the area to which the access can be gained only by the licensed device. For example, in the method described in JP-A-No. 2001-057019, the data is encrypted by a public key encryption system, the secret key is stored in the area to which normally the access cannot be gained, and the secret key is obtained by obtaining the license. Therefore, the data can be decoded by the secret key. However, since the license agreement system is adopted, an indefinite number of devices can use the data by obtaining only one license, and the unauthorized use can easily be performed.

JP-A-No. 2003-099729 describes the SD memory card which has the authentication function and two kinds of storage areas. The access to the two kinds of the storage areas can be gained according to the authentication.

In the storage medium having the high device compatibility, there is a demand that the digital data having the commercial value is distributed without losing the device compatibility while stored on the storage medium and the digital data stored on one storage medium can be used only by one information device. However, as described above, currently there is no method of appropriately protecting the digital data having the commercial value.

SUMMARY OF THE INVENTION

The present invention is to solve the foregoing problem, an object of the invention is to provide a storage medium access control method in which the detachable storage medium can be used only with the single device.

In order to achieve the object, according to one aspect of the invention, a method of controlling to read encrypted digital data from a detachable storage medium in which the encrypted digital data and a decode key for decoding encryption of the digital data are stored, includes a decode key reading step of reading the decode key; a decode key deleting step of deleting the decode key from the storage medium after the decode key reading step; a digital data reading step of reading the encrypted digital data; and a digital data decoding step of decoding the encrypted digital data by using the decode key read in the decode key reading step.

BRIEF DESCRIPTION OF THE DRAWINGS

The above object of the invention will be apparent from the following drawings and the detail description based on the drawings, in which.

DESCRIPTION OF THE PREFERRED EMBODIMENTS

Preferred embodiments of the invention will be described in detail below with reference to the accompanying drawings.

First Embodiment

Figure 1:
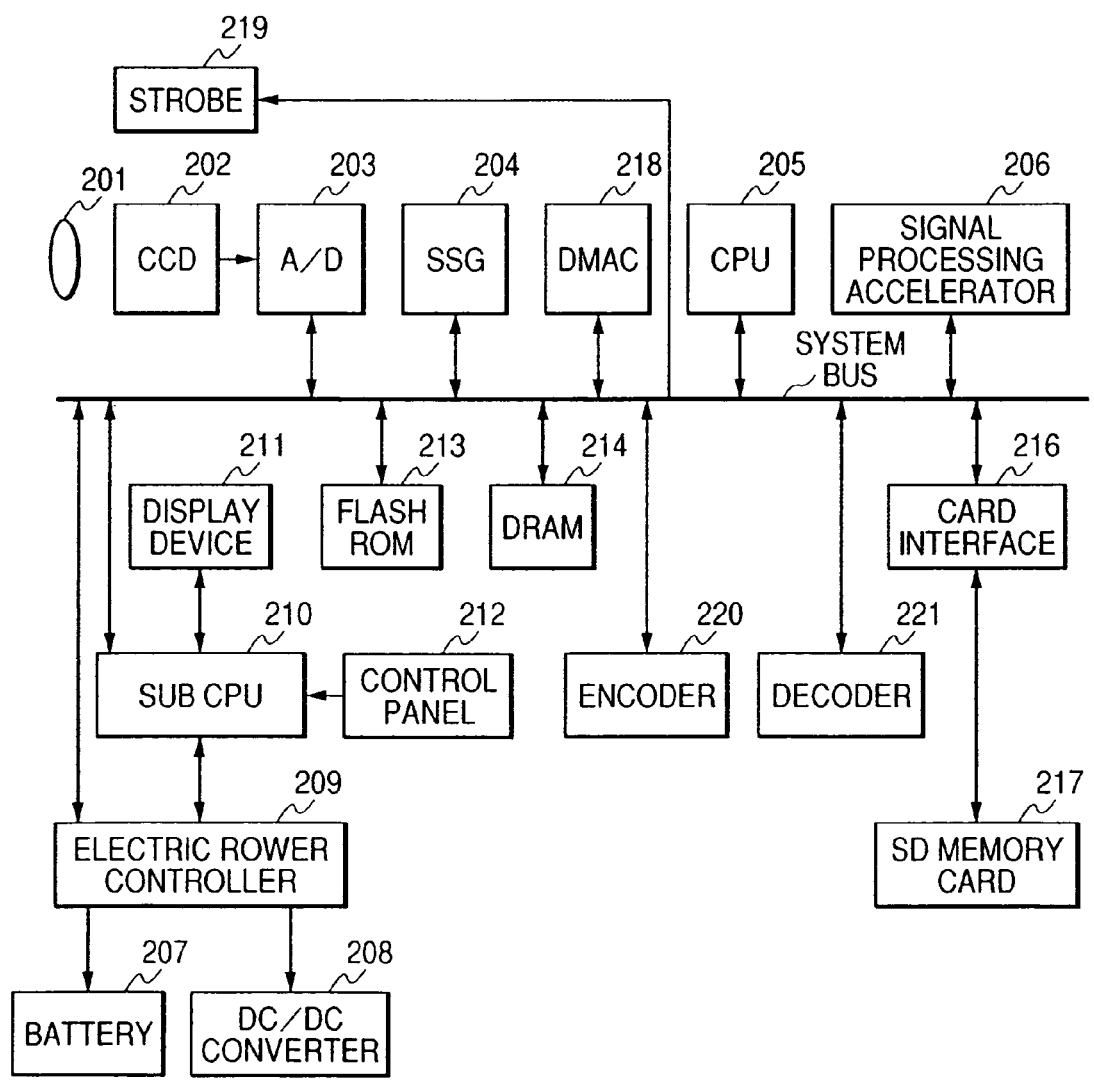
FIG. 1 is a block diagram schematically showing a structure of an embodiment of the invention.
Figure 2:
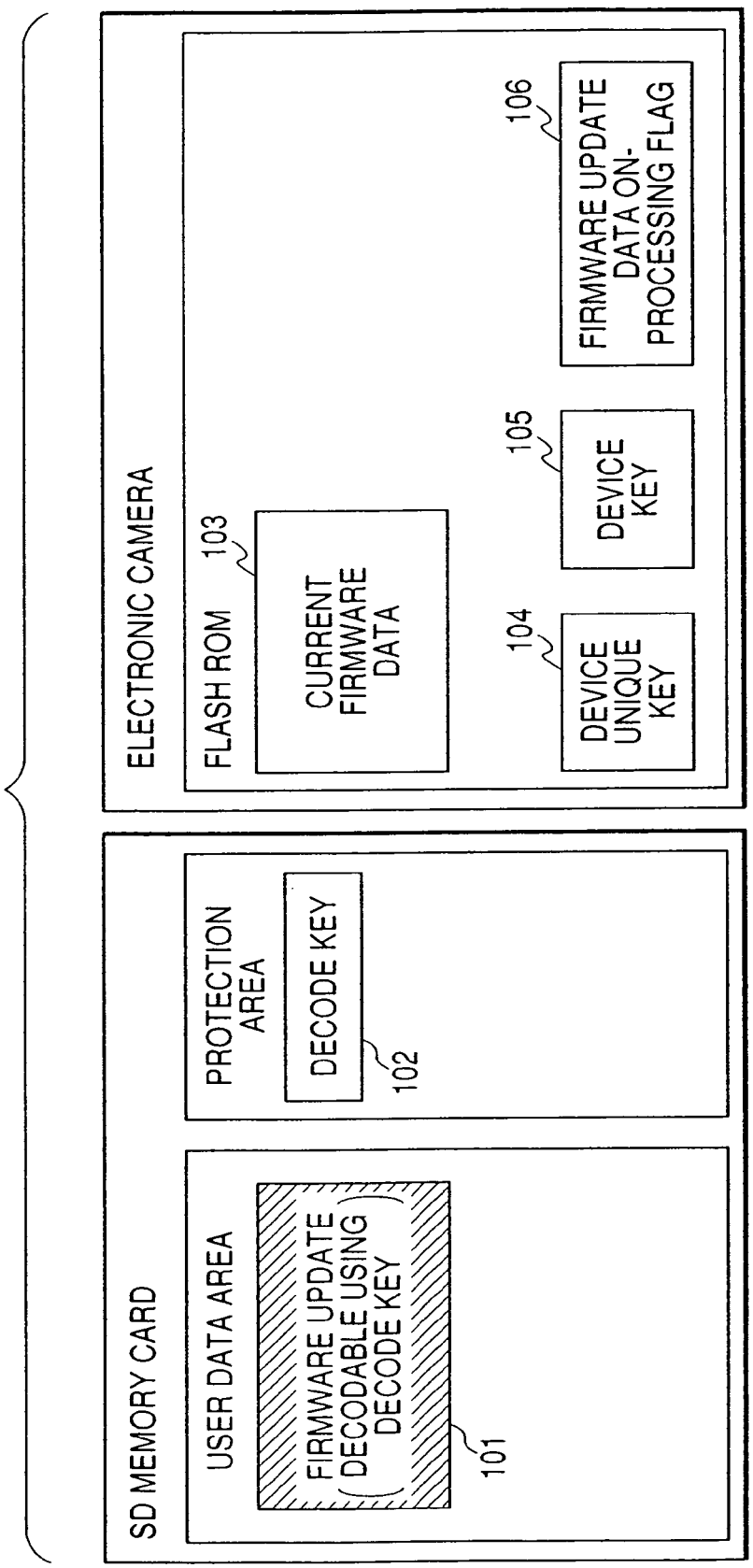
FIG. 2 shows an example of data stored in a flash ROM 213 and a protection area and a user data area of an SD memory card.

FIG. 1 is a block diagram schematically showing structure of a camera system according to a first embodiment of the invention. The camera system of the first embodiment includes an electronic camera and a SD memory card 217 which is of a detachable external storage medium. The SD memory card 217 is connected to the electronic camera through a card interface 216.

The numeral 201 designates a lens, and the numeral 202 designates a CCD unit which receives light passing through the lens 201 to output an electric signal corresponding to the received light. The numeral 203 designates an A/D converter which converts an analog signal from the CCD unit 202 into a digital signal. The numeral 204 designates an SSG unit which supplies synchronizing signals to the CCD unit 202 and the A/D converter 203. The numeral 205 designates a CPU which realizes various kinds of control in the camera system.

The numeral 206 designates a signal processing accelerator which realizes the signal processing at high speed. The numeral 207 designates a battery, and the numeral 208 designates a DC/DC converter which supplies electric power from the battery 207 to the whole of the electronic camera. The numeral 209 designates an electric power controller unit which controls the DC/DC converter 208. The numeral 210 designates a sub-CPU which controls panel operation, teaching device, and a power supply. The numeral 211 designates a device which displays various kinds of information to a user. A liquid crystal panel and the like are used as the device 211. The numeral 212 designates a control panel including a release switch and menu button, which are directly operated by the user.

The numeral 213 designates a flash ROM. A device unique key of the electronic camera, a device key which are commonly used among the type of the electronic camera, and a firmware program are stored in the flash ROM 213. The device unique key and the device key will be described in detail later. The flash ROM 213 is also used as a data temporary storage area and a processing status storage area in a firmware update process because the storage data is not lost irrespective of electric power supply. The detail action of the flash ROM 213 will be described later. The numeral 214 designates DRAM which is of a main storage of the electronic camera. The numeral 216 designates a card interface unit for the SD memory card and the like, and the numeral 217 designates the SD memory card which is of the external storage medium. The numeral 218 designates a DMA controller, and the numeral 219 designates a strobe.

The numeral 220 designates an encoder. The encoder 220 encrypts the specified data in the flash ROM 213 based on the set encryption key, and the encoder 220 writes the encrypted data in the flash ROM 213 again. The electronic camera 221 designates a decoder. On the contrary to the encoder 220 the decoder 221 decodes the specified data of the flash ROM 213 based on the set decode key, and the decoder 221 writes the decoded data in the flash ROM 213 again.

Then, the normal firmware update action of the electronic camera will be described with reference to FIG. 7. In the update action, it is assumed that SD memory card 217 in which firmware data to be updated is stored is attached to the card interface unit 216. First a user operates the control panel 212 to select a start menu of the firmware update while watching the liquid crystal panel 211 (Step 301). The CPU 205 detects the user's selection to start the update action. The following processes are performed under the control of the CPU 205 unless otherwise specified.

When the firmware update is selected from the menu, the CPU 205 sets a firmware update on-processing flag in the flash ROM 213 in Step 302. The firmware update on-processing flag is one which indicates the firmware update process is in process. Because the firmware update on-processing flag is stored in the flash ROM 213 which is of a non-volatile ROM, the firmware update on-processing flag is not cleared even if the electric power supply is stopped during the firmware update process. In case where the electric power supply is stopped during the firmware update process, at the time of the next electric power on (Step 303) it is determined whether the firmware update on-processing flag is set or not in Step 304. When the firmware update on-processing flag is set, the firmware update process is resumed. When the firmware update on-processing flag is not set, the normal start-up is performed.

After the firmware update on-processing flag is set in Step 302, or when the firmware update on-processing flag is set in Step 304, in Step 305 a firmware update program is read from the flash ROM 213 to load the firmware update program into RAM 214. The firmware update program is one which can be written in the flash ROM 213 and can read the data of the SD memory card 217 through the card interface unit 216.

The CPU 205 performs the following steps by execution of the firmware update program. In Step 306, the CPU 205 determines whether firmware update data exists in the flash ROM 213 or not. Step 306 is the process for a case in which the start-up is performed through Steps 303 and 304 because the electric power supply is stopped during the firmware update process. When the CPU 205 determines that the firmware update data does not exist in Step 306, the CPU 205 reads the firmware update data from the SD memory card 217.

Then, in Step 308, an address (jump destination address) of the program performed after boot is changed from a current firmware front-end address to the new firmware front-end address read in Step 307.

Finally, the already-existing firmware data is deleted from the flash ROM 213 in Step 309, and the firmware update on-processing flag of the flash ROM 213 is reset in Step 310. Further, in Step 311, the power of the electronic camera is turned off to complete the update action.

After the update completion, when the power is turned on, the program is started by performing the jump to the front-end address of the newly updated firmware. Even if the electric power supply is abruptly stopped during the update action, the process can be resumed halfway by the firmware update on-processing flag. Accordingly, even if the electric power supply is abruptly stopped during the update action, the firmware update process can be resumed and completed without failing the update action.

A configuration and a function of the SD memory card 217 used in the first embodiment will be described below. The SD memory card 217 has the configuration and the security function described in paragraph Nos. 0032 to 0042 of JP-A-No. 2003-099729. That is, the SD memory card 217 includes a memory unit and a memory controller. The memory controller controls the read and write of the data in the memory unit. The memory unit includes a mask ROM and EEPROM 22. A system area and a concealed area are provided in the mask ROM, and a protection area and a user data area are provided in EEPROM. A media key block (MKB) and a media-ID are stored in the system area, and MKB and the media-ID cannot be rewritten. The SD memory card is connected to one of other devices, and MKB and the media-ID are read from the device. At this point, when the device from which reads MKB and the media-ID area performs correctly predetermined computation using MKB, the media-ID, and a device key Kd set in an application program of the device, the device can posses a correct encryption key Kmu.

The encryption key Kmu which is of a correct answer value is stored in the concealed area. The encryption key Kmu should be obtained when the device performs the normal computation with the normal device key Kd. Utilization condition information is stored in the protection area.

Irrespective of whether legitimacy of the device is authenticated or not, the device to which the SD memory card 217 is attached can access to the user data area. Encrypted contents are stored in the user data area.

A protocol for writing the data in the protection area and a protocol for writing the data in the user data area differ largely from each other. The data write in the user data area is performed according to a write command from the device to which the SD memory card 217 is attached. On the other hand, for the data write in the protection area, the authentication is required according to a secure write protocol prior to issue of the write command. Specifically MKB is read from the system area, and a 56-bit encryption key Km is generated by the computation using MKB and the device key Kd set in the application program. The media-ID (MID) is read from the system area to perform a predetermined computation with MID and Km, which obtains a 64-bit computation result. The lower-order 56 bits in the 64-bit computation result are set as the encryption key Kmu. The authentication is mutually performed through an authentication and key exchange (AKE) process, and a session key Ks is shared by using the encryption key Kmu. The data is encrypted by using the session key Ks and then is written in the protection area.

The device key stored in the flash ROM 213 is the key information which is uniquely possessed by each device being able to access to the SD memory card. The device key is granted by an association which promotes standardization of copyright protection technology and the like in the SD memory card under condition that a software house developing the application program officially makes a contact with the association. The contract includes a prohibition term that the application program in which the protection area is freely rewritten according to the user's operation should be not developed. Therefore, even if the data can be written in the protection area, the program for performing license management of the digital copyright, accounting management, and personal information management never freely writes the data in the protection area at user's direction. The firmware program stored in the flash ROM 213 is produced such that the data is not freely rewritten in the protection area according to the user's operation.

Figure 8:
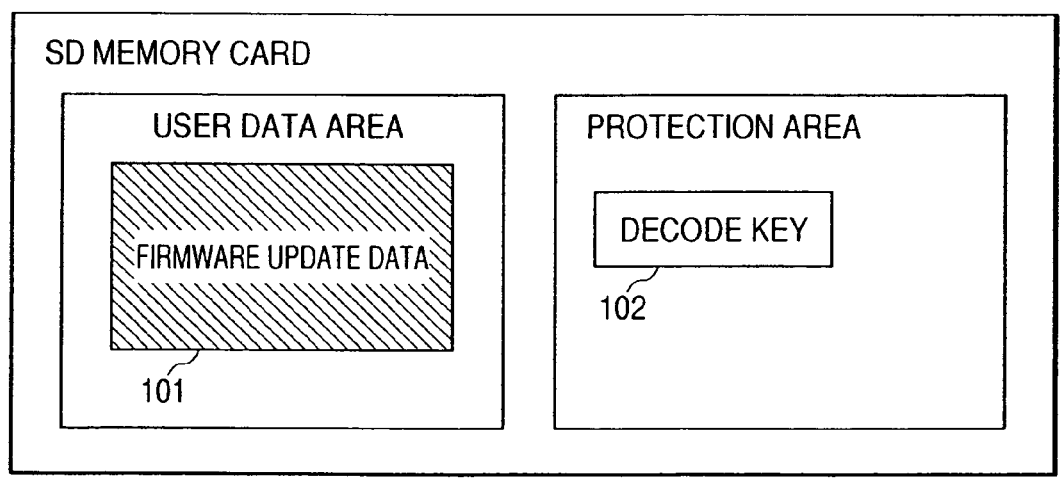
FIG. 8 shows storage data in the protection area and the user data area when the SD memory card has not been used yet.

In the embodiment, the SD memory card 217 is used as the storage medium which distributes the firmware update data of the electronic camera. FIG. 8 is a schematic view showing the firmware update data stored in the user data area and a decode key stored in the protection area of the SD memory card 217, when the SD memory card 217 has not been used yet. Referring to FIG. 8, the numeral 101 designates encrypted firmware update data, and the firmware update data 101 is stored in the user data area as a file name of "Initial New Firm.bin". The numeral 102 designates a decode key, and the decode key 102 is stored in the protection area as a file name of "Initial Key.dat". The firmware update data 101 can be decoded by the decode key 102.

As described above, it can be specified whether the data written in the protection area is shared among the plural applications or not. In the embodiment, the decode key 102 is written as the data which is not shared among the plural applications. Accordingly, it is assured that only the electronic camera, which has the device key and is operated by above application program, can access to the decode key 102. At this point, the electronic camera does not mean one which has the specific manufacturer's serial number, but means all the electronic cameras, each of which has the device key and is operated by the application program. Hereinafter, "electronic camera" should mean all the electronic cameras which can access to the decode key 102.

An initial access procedure in the first embodiment will be described below. The initial access procedure is the procedure of accessing to the decode key 102 and the firmware update data 101, in the case where the SD memory card 217 has not been used yet at the time when the electronic camera to which the SD memory card 217 is attached detects the user's selection of the firmware update start menu. FIGS. 2 to 6 show examples of the data stored in the flash ROM 213 and the protection area and the user data area of the SD memory card 217. The status is changed in the order of FIG. 2, FIG. 3, FIG. 4, FIG. 5, and FIG. 6.

Figure 9:
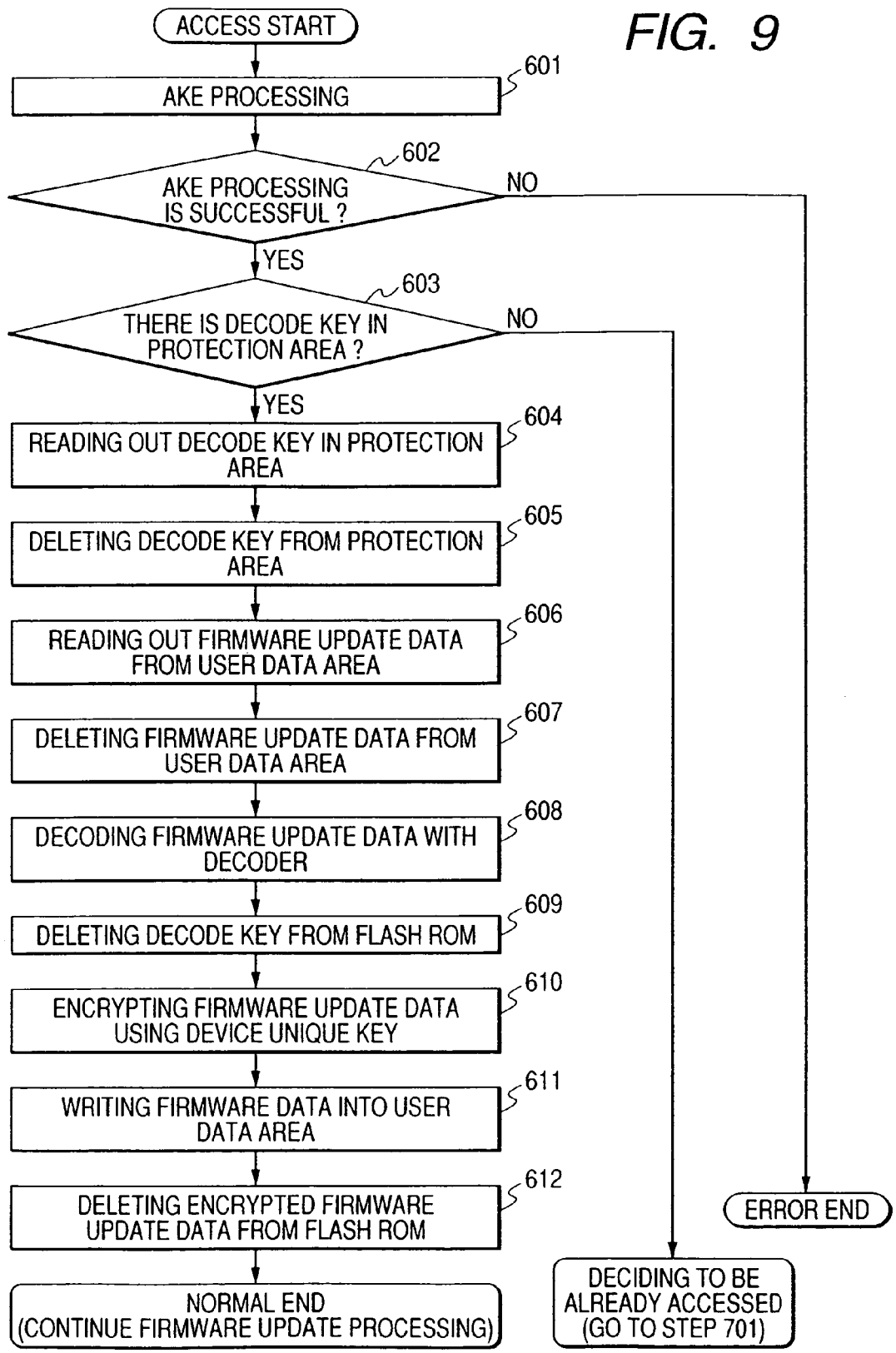
FIG. 9 is a flowchart showing an initial access procedure.

FIG. 9 shows a flowchart of the initial access procedure. The initial access procedure is the action led by the electronic camera such that the SD memory card fully responds the access from electronic camera. The initial access procedure is automatically performed by the application program when reading the firmware update data (Step 307 in FIG. 7), and the user cannot specify another action during the initial access procedure. As with the firmware update action, in order to handle up to the stop of the electric power supply stop during the process, the data which should not be deleted is stored in the flash ROM 213. In the following description of the flowchart, the data which is clearly described as being stored in the flash ROM 213 is utilized in the restart after the power electric supply is abruptly stopped, and the data is never automatically deleted depending on the power on and off.

Referring to FIG. 9, in Step 601, the electronic camera performs the AKE process to the SD memory card 217. In Step 602, the electronic camera determines whether the AKE process is successful or not. When the AKE process is not successful, the initial access procedure is ended at this point. Further, because the readout of the firmware update data is not successful, the firmware update process itself is also not to be successful and the firmware update process is ended.

When the AKE process is successful in Step 602, in Step 603 the access to the protection area is gained to determine whether the decode key 102 (file "Initial Key.dat") exists or not. When the decode key 102 does not exist, the electronic camera determines that the SD memory card 217 has been used, and the initial access procedure is ended. When the decode key 102 exists, the electronic camera reads the decode key 102 (file "Initial Key.dat") and stores the decode key in the flash ROM 213 in Step 604. In Step 605, the read decode key (file "Initial Key.dat") is deleted from the protection area of the SD memory card 217.

Figure 3:
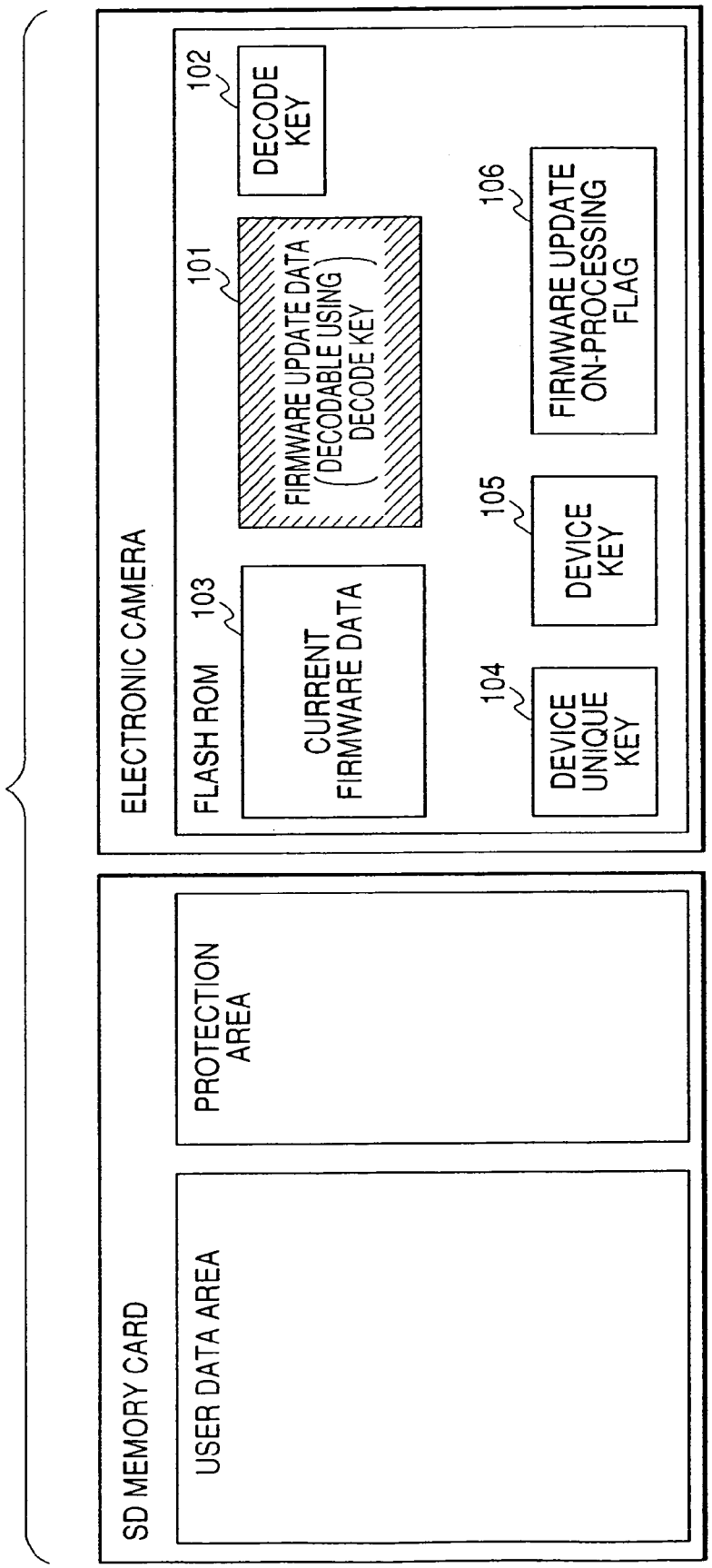
FIG. 3 shows an example of data stored in the flash ROM 213 and the protection area and the user data area of the SD memory card.

In Step 606, the electronic camera accesses to the user data area to read the firmware update data 101 (file "Initial New Firm.bin"), and to store firmware update data 101 in the flash ROM 213. In Step 607, like the decode key 102, the firmware update data 101 is deleted from the user data area of the SD memory card 217. At this point, data stored in the flash ROM 213 of the electronic camera and in the protection area and user data area of the SD memory card 217 is shown in FIG. 3. Since both the decode key 102 and the firmware update data 101 are deleted, at this point no data is stored in the protection area and the user data area.

In Step 608, the decode key 102 is set in the decoder 221 to decode the firmware update data 101. At this time, because the decode key 102 is not necessary any more, the decode key 102 is deleted from the flash ROM 213 of the electronic camera in Step 609.

Figure 4:
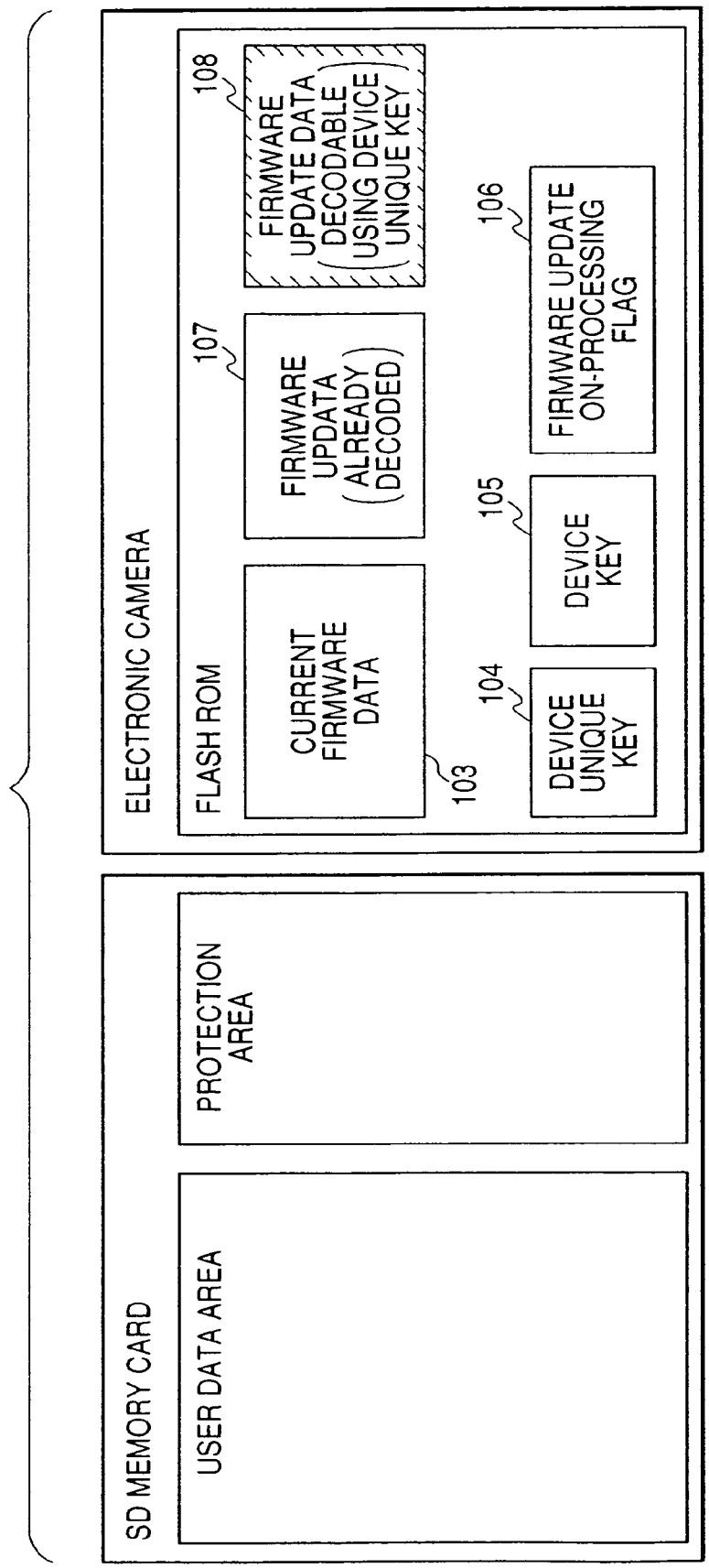
FIG. 4 shows an example of data stored in the flash ROM 213 and the protection area and the user data area of the SD memory card.

In Step 610, the encoder 220 encrypts the decoded firmware update data 101 again with the device unique key. Unlike the device key, the device unique key includes a unique value with respect to the individual electronic camera. Accordingly, the firmware update data 101 encrypted using the device unique key can be decoded only by the electronic camera in which the encryption is performed, and the encrypted firmware update data 101 cannot be decoded by other electronic cameras which is the same type. The encrypted firmware update data 101 is written in the flash ROM 213 again. At this point, an example of the data stored in the flash ROM 213 of the electronic camera and in the protection area and user data area of the SD memory card 217 is shown in FIG. 4. Referring to FIG. 4, the numeral 107 designates data in which the firmware update data 101 is decoded using the decode key 102, and the numeral 108 designates data in which the data 107 is encrypted using the device unique key again.

Figure 5:
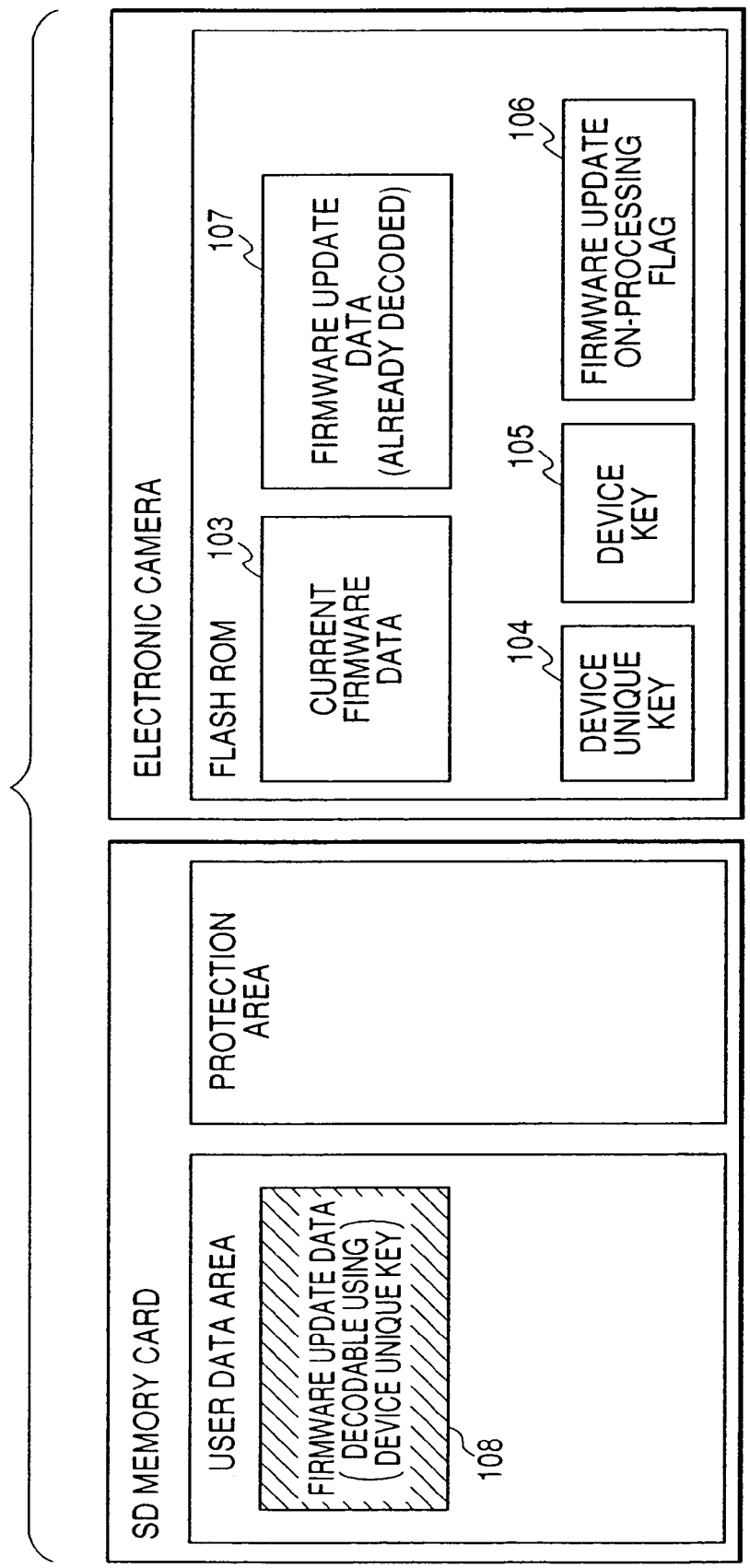
FIG. 5 shows an example of data stored in the flash ROM 213 and the protection area and the user data area of the SD memory card.
Figure 6:
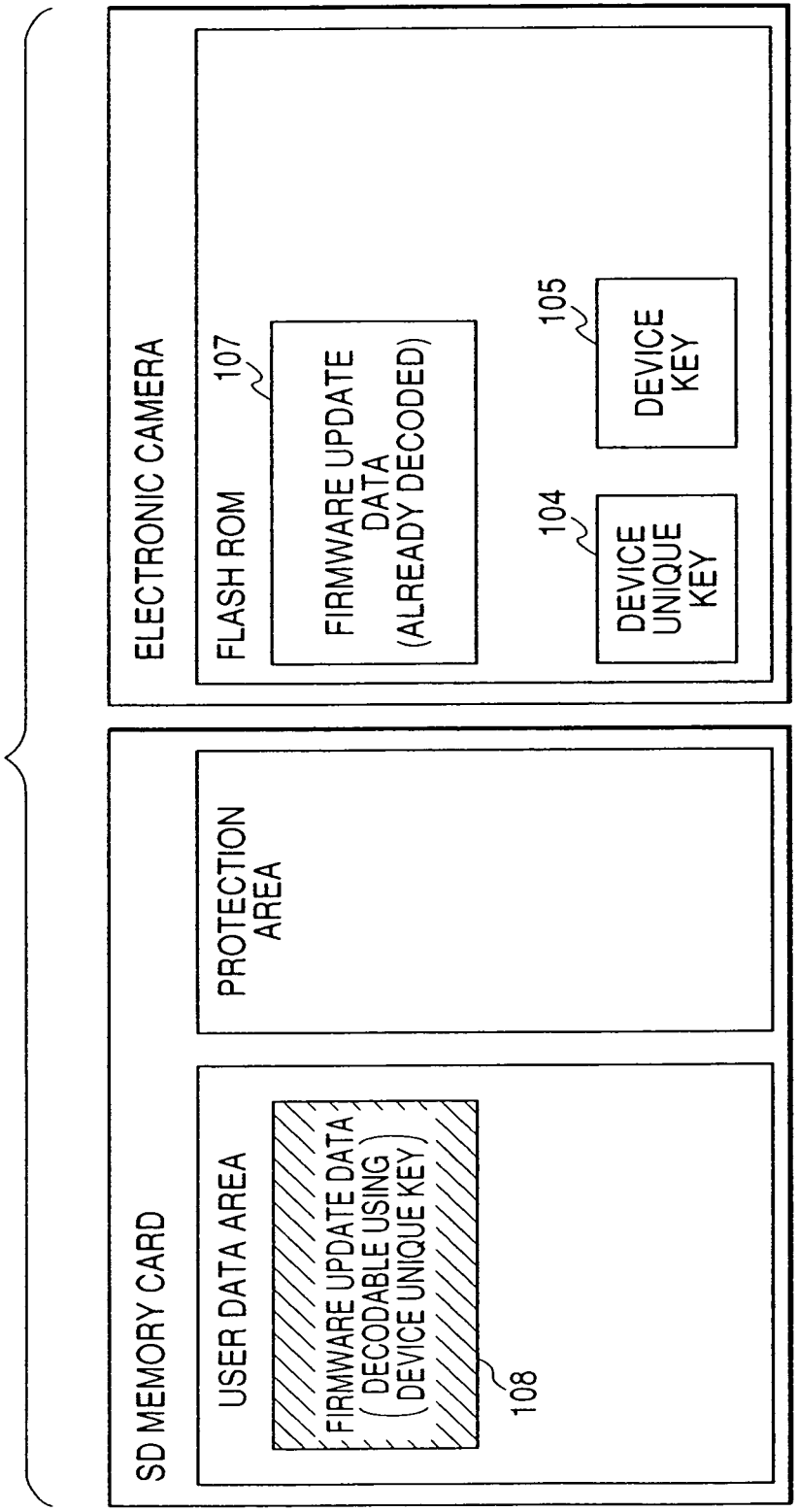
FIG. 6 shows an example of data stored in the flash ROM 213 and the protection area and the user data area of the SD memory card.

When the encryption is completed in Step 610, the re-encrypted firmware update data 108 is written as a file name of "Encoded New Firm.bin" in the user data area of the SD memory card 217 in Step 611. In Step 612, the encrypted firmware update data 108 is deleted from the flash ROM 213, and the initial access procedure is ended. At this point, an example of the data stored in the flash ROM 213 and in the protection area and user data area of the SD memory card 217 is shown in FIG. 5. The firmware update data 108 (file "Encoded New Firm.bin") is stored in the user data area. The firmware update data 108 is encrypted by the device unique key of the electronic camera reading the firmware update data 101. Then, the firmware update process is continued from Step 308 of FIG. 7 using the firmware update data 107 which is stored in the flash ROM 213 decoded in Step 608.

The access procedure, in which the electronic camera tries to access to the SD memory card 217 which has been used, i.e. a second and later access procedure will be described below. That is, in the initial access procedure, the electronic camera determines that at least one-time access to the stored data is already gained in the SD memory card 217. The second and later access procedure is one which is performed when the electronic camera determines that the decode key 102 does not exist in Step 603 of the initial access procedure of FIG. 9.

Figure 10:
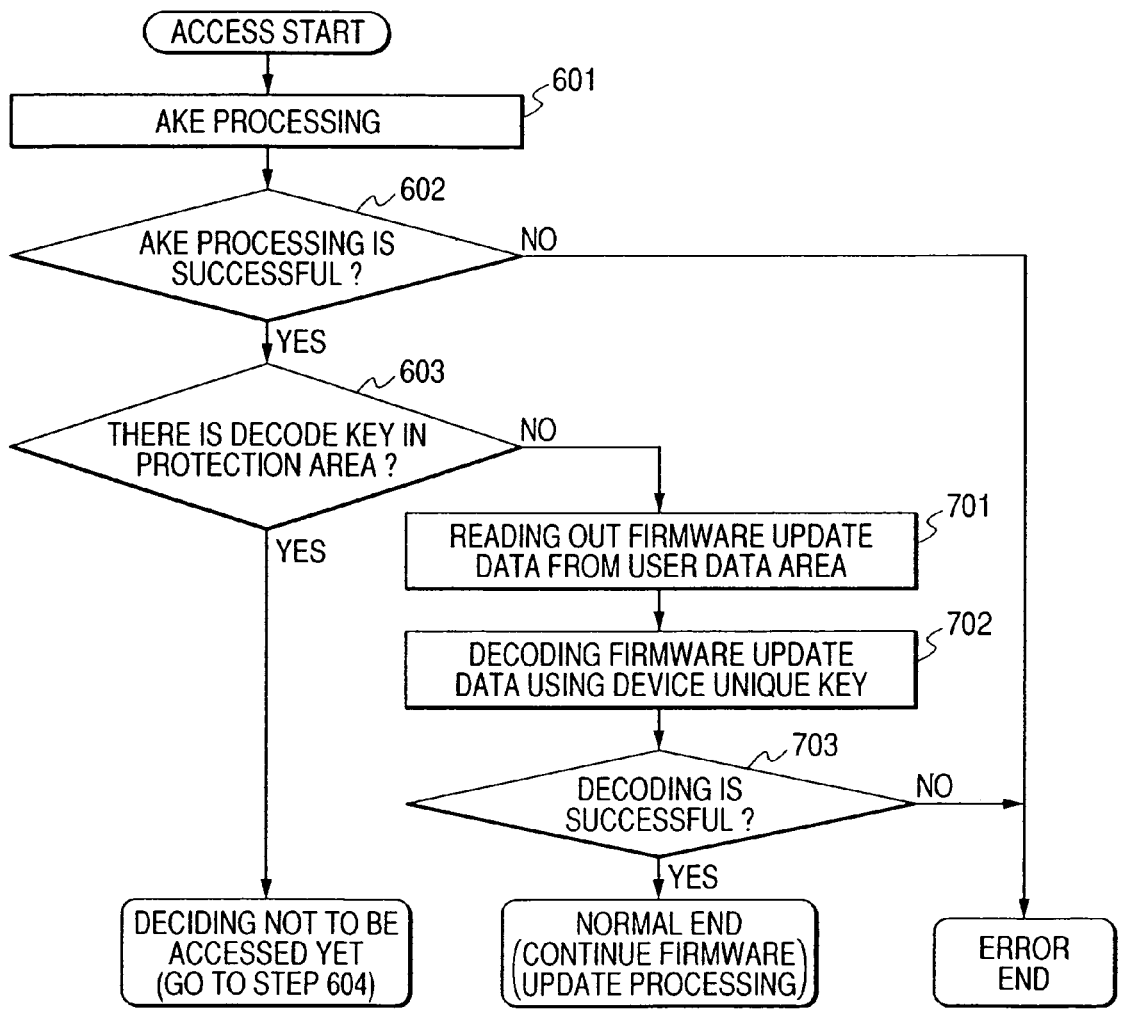
FIG. 10 is a flowchart showing a second and later access procedure.

FIG. 10 shows a flowchart of the second and later access procedure. As with the initial access procedure, the second and later access procedure is automatically performed by the firmware program when reading the firmware update data 101 (Step 307 in FIG. 7), and the user cannot specify another action during the second and later access procedure. Further, as with the firmware update action, in order to handle up to the stop of the electric power supply stop during the process, the data which should not be deleted is stored in the flash ROM 213. In the following description of the flowchart, the data which is clearly described as being stored in the flash ROM 213 is utilized in the restart after the power electric supply is abruptly stopped, and the data is never automatically deleted depending on the power on and off.

When the electronic camera confirms that the decode key 102 does not exist in the protection area in Step 603 of FIG. 9, the flow goes to Step 701 of FIG. 10. In Step 701, the electronic camera accesses to the user data area to read the firmware update data 108 (file "Encoded New Firm.bin") encrypted using the device unique key, and to store the firmware update data 108 in the flash ROM 213. An electronic camera accesses to the firmware update data 108 once in the initial access procedure. At this point, the firmware update data 108 is re-encrypted using the device unique key of the electronic camera which accesses to the firmware update data 108. In Step 702, the electronic camera sets the device unique key of itself in the decoder 221 to decode the firmware update data 108, and then the electronic camera performs the firmware update process using, the decoded firmware update data. When the electronic camera to which the SD memory card 217 is attached is not one which accesses to the SD memory card 217 in the initial time, the decoder 221 generates a decode error in the decode process in Step 702, and the second and later access procedure is ended at that point. Since the readout of the firmware update data is also not successful, the firmware update process itself is not successful, and the firmware update process is ended (Step 703).

Second Embodiment

Figure 11:
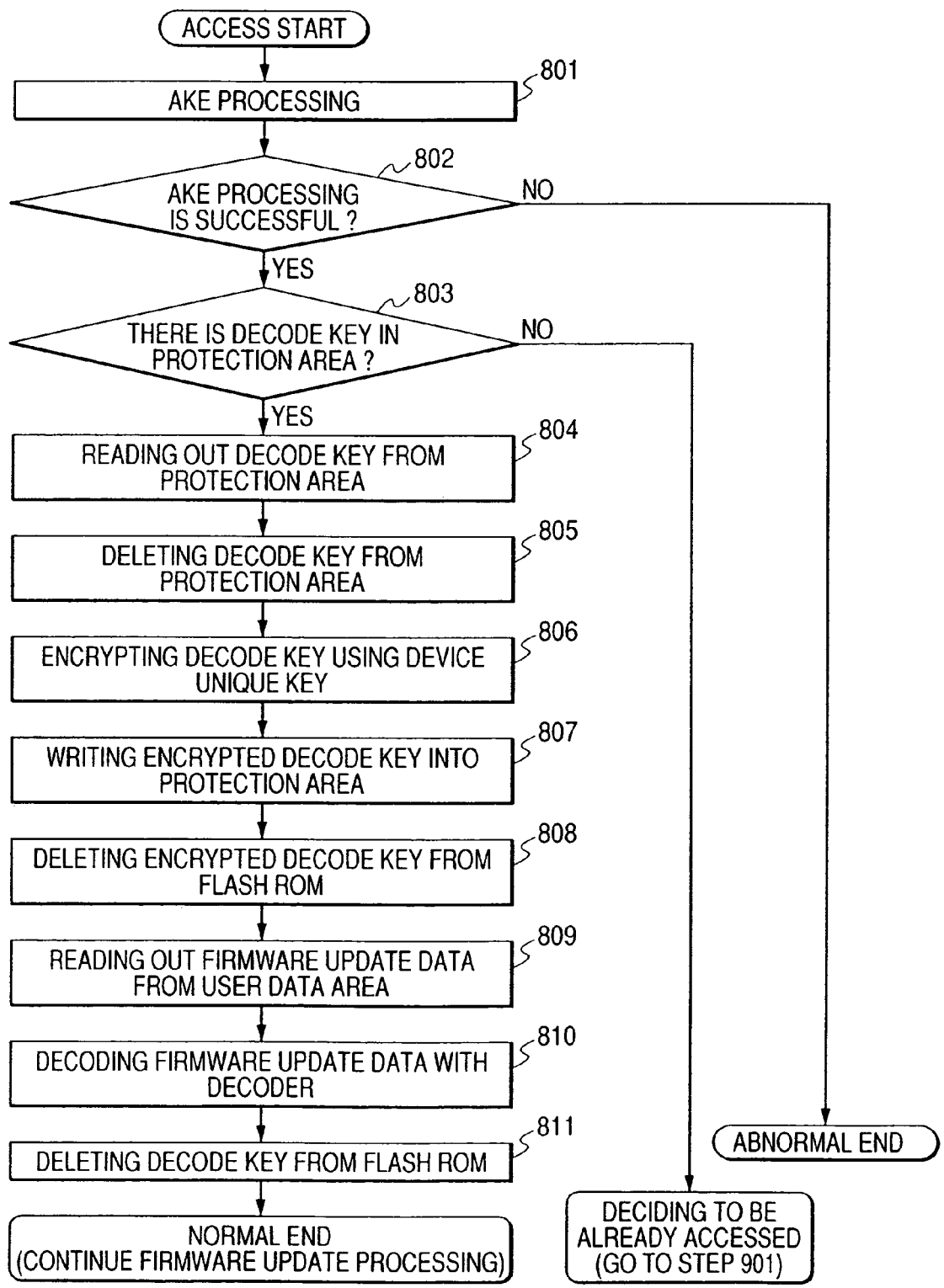
FIG. 11 is a flowchart showing another operation example of the initial access procedure.
Figure 12:
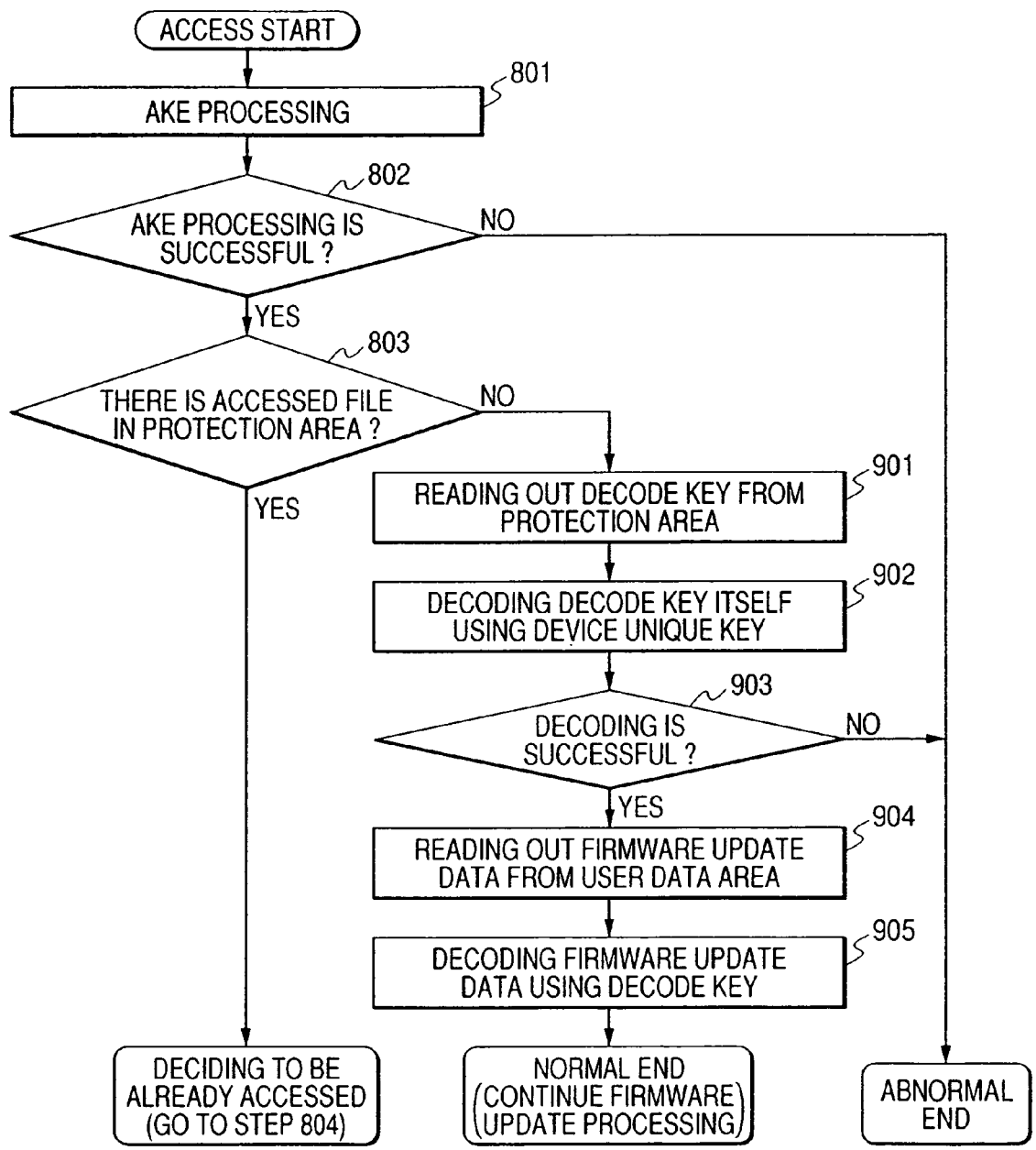
FIG. 12 is a flowchart showing another operation example of the second and later access procedure.
Figure 13:
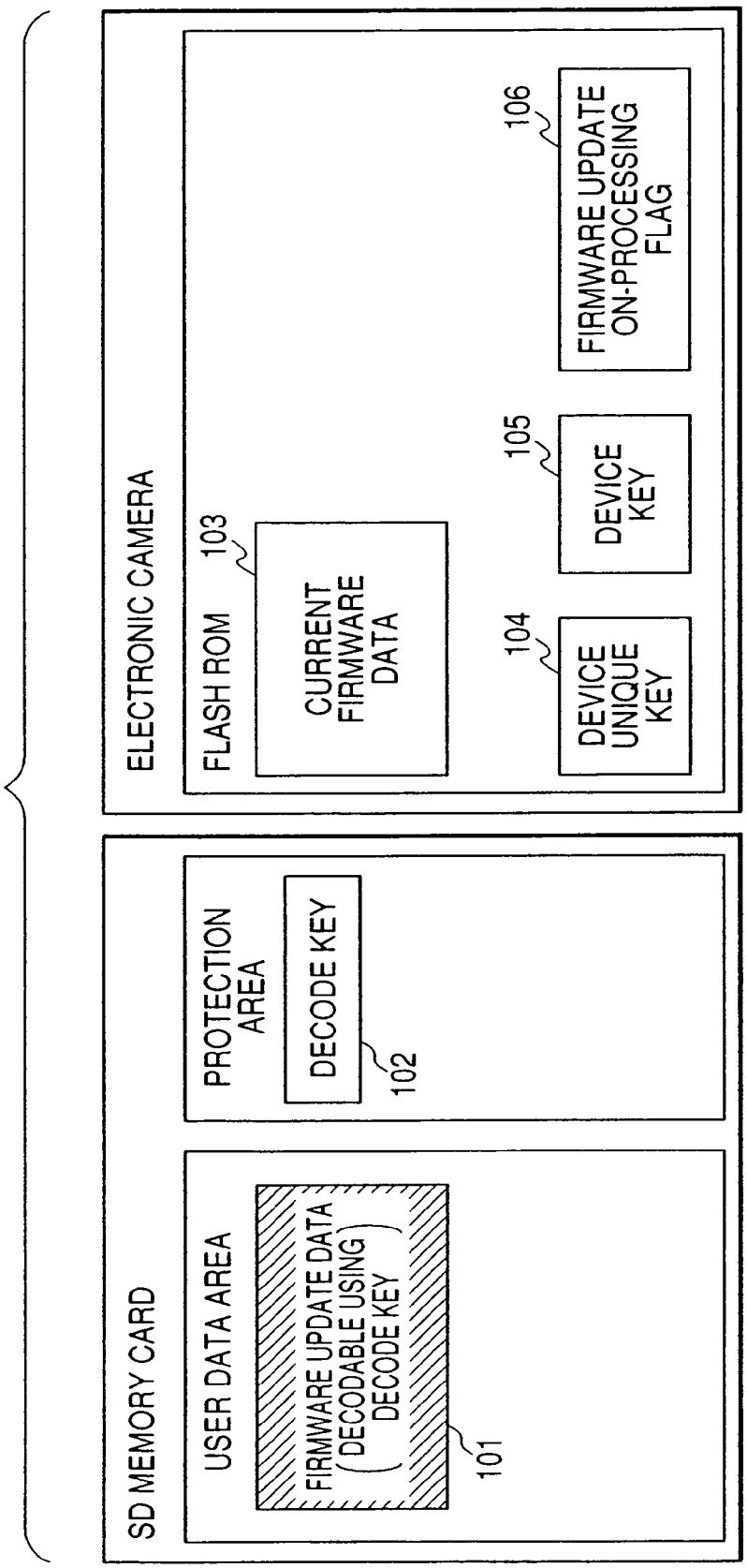
FIG. 13 shows an example of data arrangements of the flash ROM 213 and the SD memory card corresponding to FIGS. 11 and 12.
Figure 14:
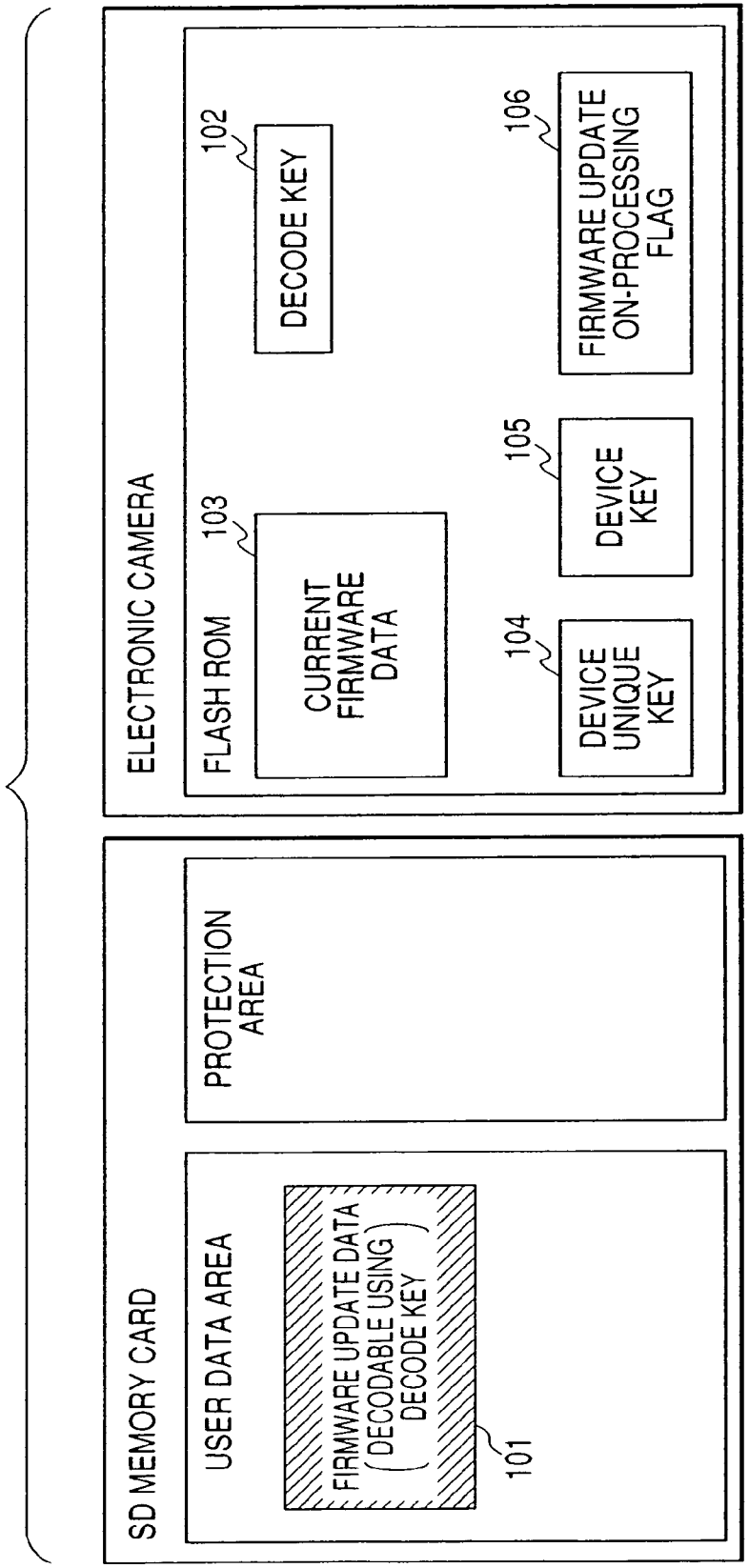
FIG. 14 shows an example of the data arrangements of the flash ROM 213 and the SD memory card corresponding to FIGS. 11 and 12.
Figure 15:
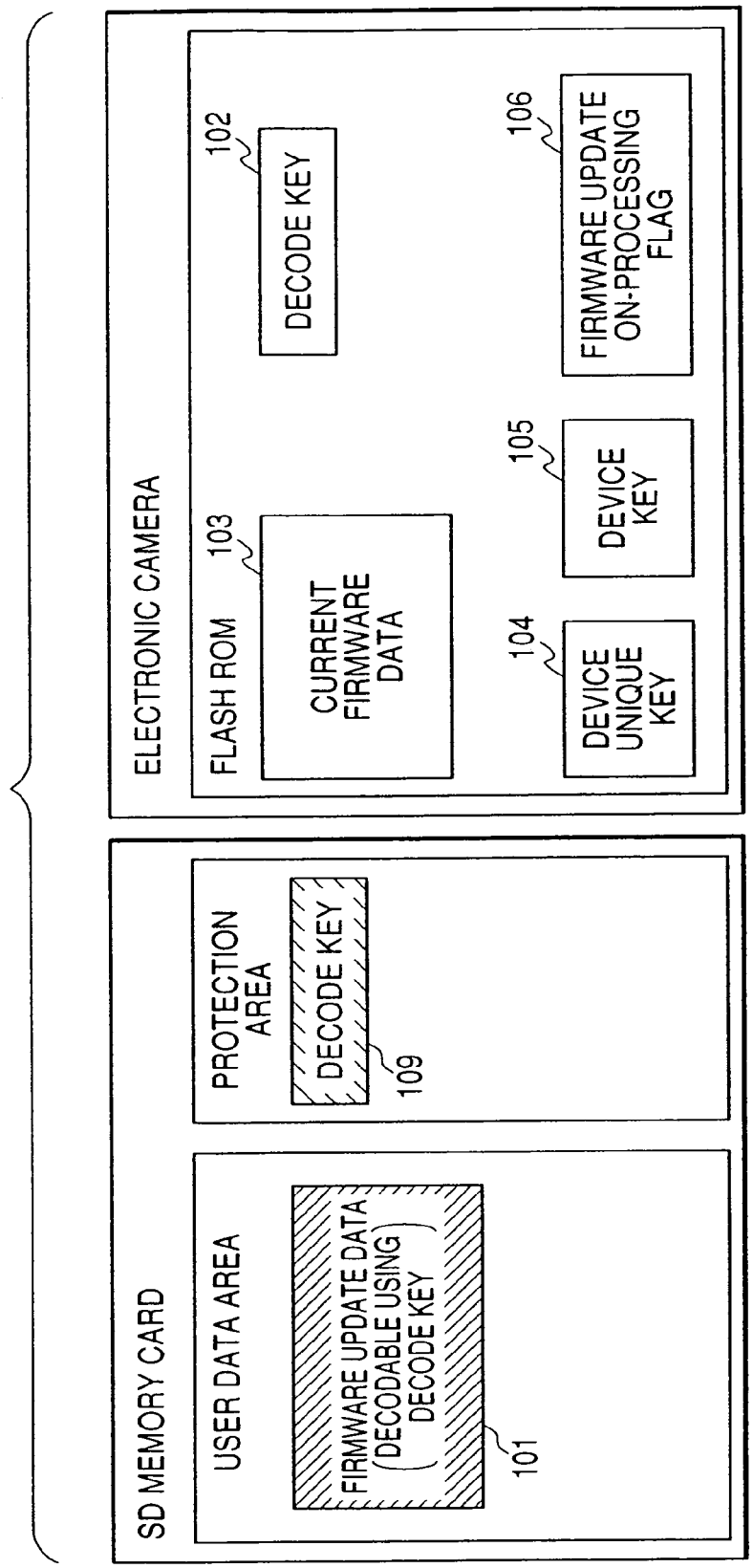
FIG. 15 shows an example of the data arrangements of the flash ROM 213 and the SD memory card corresponding to FIGS. 11 and 12.

Then, a second embodiment of the invention will be described. The second embodiment differs from the first embodiment only in the initial access procedure and the second and later access procedure. FIG. 11 shows a flowchart of the initial access procedure of the second embodiment, and FIG. 12 shows a flowchart of the second and later access procedure of the second embodiment. FIGS. 13 to 15 show examples of the data stored in the flash ROM 213 and in the protection area and the user data area of the SD memory card. The status is changed in the order of FIG. 2, FIG. 13, FIG. 14, and FIG. 15.

The initial access procedure shown in FIG. 11 is the action led by the electronic camera such that the SD memory card 217 fully responds the electronic camera. The initial access procedure is automatically performed by the application program when reading the firmware update data (Step 307 in FIG. 7), and the user cannot specify another action during the initial access procedure. As with the firmware update action, in order to handle up to stop of the electric power supply stop during the process, the data which should not be deleted is stored in the flash ROM 213. In the following description of the flowchart, the data which is clearly described as being stored in the flash ROM 213 is utilized in the restart after the power electric supply is abruptly stopped, and the data is never automatically deleted depending on the power on and off.

Referring to FIG. 11, in Step 801, the electronic camera performs the AKE process to the SD memory card 217. In Step 802, the electronic camera determines whether the AKE process is successful or not. When the AKE process is not successful, the initial access procedure is ended at this point. Because the readout of the firmware update data is not to be successful, the firmware update process itself is also not successful and the firmware update process is ended.

When the AKE process is successful in Step 802, the electronic camera accesses to the protection area to check the stored file name in Step 803. Since the file name of the data 102 is "Initial Key.dat" in FIG. 8 showing the storage data in the SD memory card which has not been used yet, when the file name of "Initial Key.dat" exists, the electronic camera determines that the access to the SD card has never been gained. On the other hand, when the file name of "Initial Key.dat" does not exist but the file name of "Encoded Key.dat" exists, the electronic camera determines that the access to the SD card has already been gained. This is because the file having the name of "Encoded Key.dat" is stored after "Initial Key.dat" is read and deleted in the execution step of the initial access procedure. The detail will be described later.

When the electronic camera can confirm that the file "Encoded Key.dat" exists, the electronic camera determines that the access to the SD memory card 217 has already been gained, and the initial access procedure is ended.

When the electronic camera can confirm that the file "Initial Key.dat" exists in Step 803, the electronic camera determines that the access to the SD memory card has never been gained. In Step 804, the electronic camera reads the decode key 102 ("file Initial Key.dat") from the protection area. In Step 805, the electronic camera deletes the read decode key 102 (file "Initial Key.dat") from the SD memory card 217. At this point, an example of the data stored in the flash ROM 213 of the electronic camera and in the protection area and user data area of the SD memory card 217 is shown in FIG. 14.

In Step 806, the electronic camera sets the device unique key in the encoder 220, and the electronic camera encrypts the decode key 102 to newly generate the encrypted decode key 102. In Step 807, the electronic camera writes the encrypted decode key 102 in the protection area as the file name of "Encoded Key.dat." Therefore, the encrypted decode key 102 can be decoded only by the electronic camera having the device unique key of the encrypted decode key 102. In Step 808, the electronic camera deletes the encrypted decode key 102 from the flash ROM 213. At this point, an example of the data stored in the flash ROM 213 of the electronic camera and in the protection area and user data area of the SD memory card 217 is shown in FIG. 15. Unlike the memory card which has not been used yet, shown in FIG. 13, a decode key 109 which is produced by encrypting the decode key 102 itself is stored as the file name of "Encoded Key.dat" in the protection area of the SD memory card.

In Step 809, the electronic camera reads the firmware update data 101 (file "Initial New Firm.bin") from the user data area, and the electronic camera sets the decode key 102 read in Step 804 in the decoder 221. In Step 810, the electronic camera decodes the firmware update data 101. Then, in step 811 the electronic camera deletes the decode key 102 from the flash ROM 213. The firmware update process is continued from Step 308 of FIG. 7 by using the firmware update data 101, which is stored in the flash ROM 213 and decoded in Step 810.

Then, the second and later access procedure will be described. The second and later access procedure is performed when the electronic camera determines that the file having the name of "Initial Key.dat" does not exist in Step 803 of the initial access procedure. FIG. 12 shows a flowchart of the second and later procedure.

As with the initial access procedure, the second and later access procedure is automatically performed by the firmware program when reading the firmware update data (Step 307 in FIG. 7), and the user cannot specify another action during the initial access procedure. Further, as with the firmware update action, in order to handle up to the stop of the electric power supply stop during the process, the data which should not be deleted is stored in the flash ROM 213. In the following description of the flowchart, the data which is clearly described as being stored in the flash ROM 213 is utilized in the restart after the power electric supply is abruptly stopped, and the data is never automatically deleted depending on the power on and off.

When the electronic camera confirms that the file having the name of "Initial Key.dat" does not exist in the protection area in Step 803 of FIG. 11, the flow goes to Step 901 of FIG. 12. In Step 901, the electronic camera accesses to the protection area to read the encrypted decode key 109 (file "Encoded Key.dat"). The encrypted decode key 109 is encrypted using the device unique key possessed by an electronic camera which has accessed to the SD memory card 217 in the initial time. In Step 902, the electronic camera sets the device unique key to the decoder 221 to decode the encrypted decode key 109. In Step 904, the electronic camera has accessed to the user data area to read the firmware update data 101, and the electronic camera stores the firmware update data 101 in the flash ROM 213. In Step 905, the firmware update data 101 is decoded by the decoded decode key 102. Then, the electronic camera performs the firmware update process using the decoded firmware update data.

When the electronic camera to which the SD memory card 217 is attached is not one which accesses to the SD memory card 217 in the initial time, the decoder 221 generates the decode error in Step 903, and the second and later access procedure is ended at this point. Since the readout of the firmware update data is also not successful, the firmware update process itself is not successful, and the firmware update process is ended.

Thus, when the access to the SD memory card for distributing the firmware update data has never been gained, all the devices (having the device key) which can access to the decode key 102 can utilize the firmware update data 101. When the access to the SD memory card has already been gained, only the device which has accessed to the SD memory card in the initial time can access to the SD memory card from the second time as many times as needed. On the other hand, other devices cannot utilize the firmware even if other devices posses the specified device key. Accordingly, the unauthorized use and the unauthorized copy of the firmware update data can be prevented.

As described above, the invention is described by the preferred embodiments. However, the invention is not limited to the above embodiments, but various modifications could be made without departing from the scope shown in the claims.

The object of the present invention can also be achieved by providing a storage medium storing program codes for performing the aforesaid processes, reading a program codes, by a CPU or a MPU of the image sensing system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a CPU of the image sensing system or apparatus, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the image sensing system or apparatus or in a memory provided in a function expansion unit, CPU or the like contained in the function expansion card or unit performs a part or entire process in accordance with designations of the program codes and realizes functions of the above embodiments.

Figure 7:
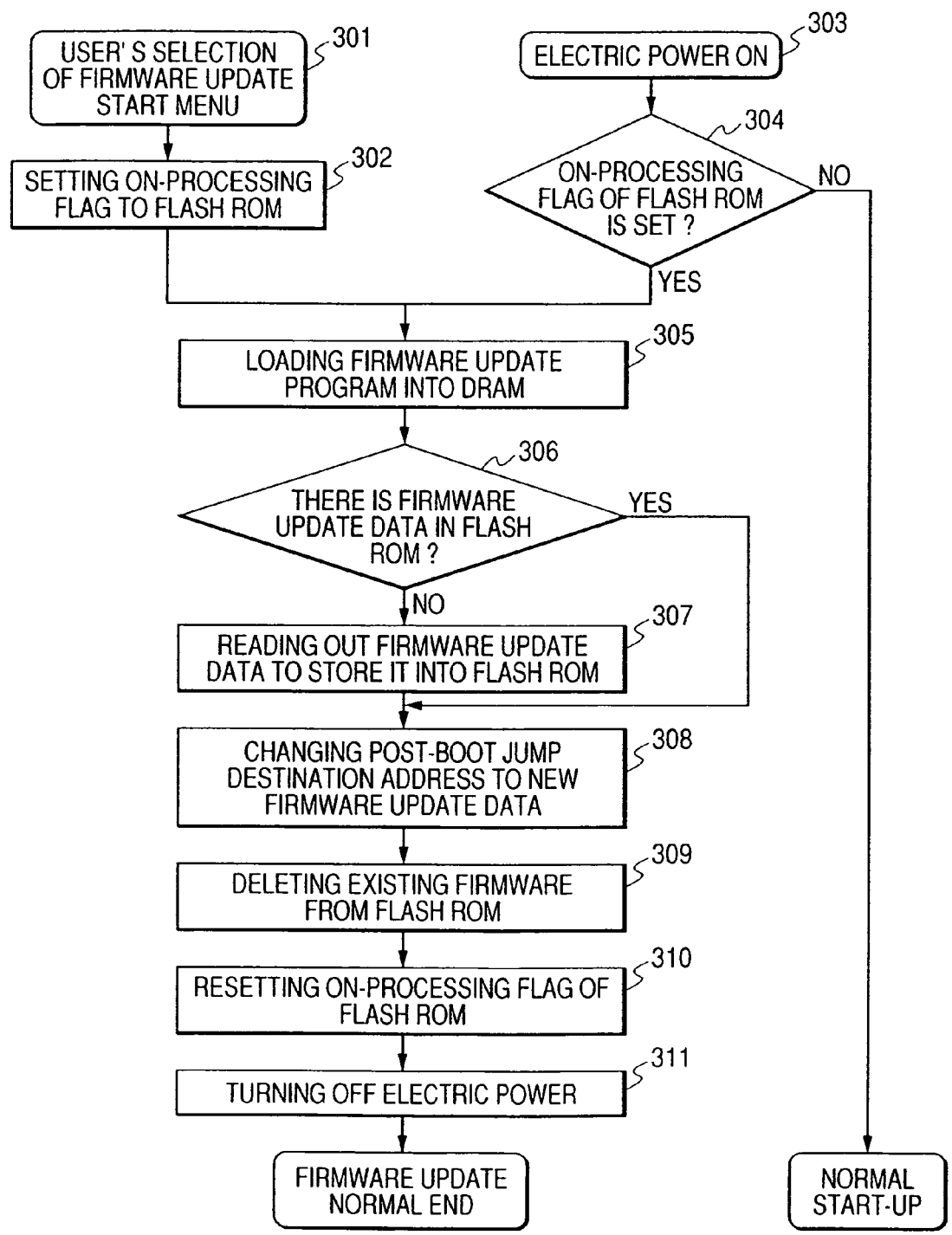
FIG. 7 is a flowchart showing a firmware update processing procedure.

In a case where the present invention is applied to the aforesaid storage medium, the storage medium stores program codes corresponding to the flowchart of FIGS. 7, 9 and 10 or the flowchart of FIGS. 7, 11 and 12 described in the embodiments.

This application claims priority from Japanese Patent Application No. 2004-264374 filed on Sep. 10, 2004, which is hereby incorporated by reference herein.

What is claimed is:

1. An information processing apparatus to which can be detachably connected a detachable storage medium on which are stored first encrypted data, which is encrypted digital data, and a decode key for decoding decryption of the first encrypted data, wherein the detachable storage medium includes a first area storing the first encrypted data corresponding to the digital data and a second area storing a decode key, the second area being protected, the information processing apparatus comprising:

an authentication unit configured to perform authentication using a device key which each apparatus capable of accessing the detachable storage medium contains therein, to make the protected second area accessible;

a decode key processing unit configured to read out the decode key from the second area on the detachable storage medium, which has been authenticated by the authentication unit, and then to delete the decode key from the second area on the detachable storage medium;

a digital data processing unit configured to read out the first encrypted data, which is encrypted digital data, from the first area on the detachable storage medium and then to delete the first encrypted data from the first area on the detachable storage medium after the first encrypted data is read out from the detachable storage medium;

a digital data decoding unit configured to decode the first encrypted data read out from the first area on the detachable storage medium to obtain the digital data, by using the decode key read out by the decode key processing unit;

a digital data encrypting unit configured to encrypt the digital data obtained by the digital data decoding unit, by using a device unique key that is generated based on unique information on the information processing apparatus to which the detachable storage medium is connected when encrypting the digital data, thereby generating second encrypted data that includes the same digital data as the first encrypted data but using a different encryption key, the device unique key being different from the device key and the decode key;

a digital data writing unit configured to write the second encrypted data generated by the digital data encrypting unit into the first area on the detachable storage medium so that the second encrypted data that is stored in the first area on the detachable storage medium is not decodable by using the decode key but is decodable by using the device unique key when the detachable storage medium is connected to the information processing apparatus; and a firmware updating unit configured to update firmware of the information processing apparatus by using the decoded digital data, wherein the information processing apparatus contains therein both the device key and the device unique key of the information processing apparatus.

2. An information processing apparatus according to claim 1, further comprising:

a decode key encrypting unit configured to encrypt the decode key read by the decode key processing unit by using the device unique key; and a decode key writing unit configured to write the decode key encrypted by the decode key encrypting unit into the protected second area on the detachable storage medium.

* * * * *